(No Model.)

N. LAZARUS.
SPECTACLE OR EYEGLASS FRAME.

No. 500,014. Patented June 20, 1893.

UNITED STATES PATENT OFFICE.

NATHAN LAZARUS, OF LONDON, ENGLAND.

SPECTACLE OR EYEGLASS FRAME.

SPECIFICATION forming part of Letters Patent No. 500,014, dated June 20, 1893.

Application filed January 2, 1891. Serial No. 376,517. (No model.) Patented in England December 11, 1890, No. 20,168.

*To all whom it may concern:*

Be it known that I, NATHAN LAZARUS, optician, a subject of the Queen of Great Britain, residing at 28 Sutherland Avenue, Harrow Road, London, England, have invented certain new and useful Improvements in the Construction of Spectacle and Eyeglass Frames, (for which I have obtained a patent in Great Britain, No. 20,168, bearing date December 11, 1890,) of which the following is a specification.

My invention relates to the frames of spectacles and other eye glasses and it has for its object to overcome objections hitherto existing in the manufacture of such frames, and to provide a novel, simple and cheap frame.

Heretofore spectacle and eye-glass frames have been provided with lugs or projections which are drawn together after the insertion of the glass by means of screws; or else the frames have been severed and springs soldered over the severed portion; but in these latter constructions the springs have been of such character that the glass cannot be firmly held in the frame with any degree of reliability.

In my invention I construct the frames with the hereinafter described peculiar spring which acts efficiently and with certainty to expand the frame for the insertion of the glass and to automatically contract it for the firm retention of the glass.

My invention is illustrated in the accompanying drawings, in which—

Figure 1:
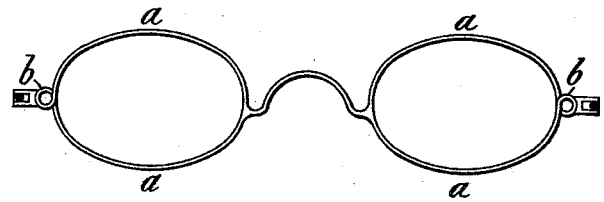
Figure 2:
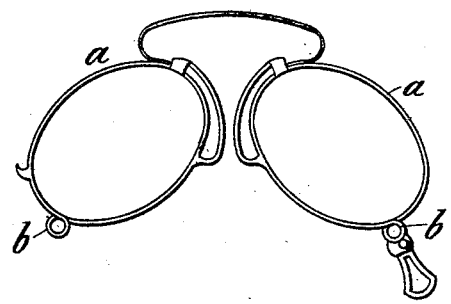

Figure 1 is a front elevation of a pair of spectacles constructed in accordance with my invention. Fig. 2 is a similar view of a pair of eye glasses embodying the invention; and Figs. 3, 4, and 5 are detail views, showing a modification of the invention.

In the said drawings the reference letter $a$ designates a spectacle frame or an eye-glass frame, which, as shown, is bent into thin flattened spiral spring coils $b$ at suitable points. These springs which are formed integral with the spectacle or eye glass frame by reason of the coil-form imparted to them exercise in a certain, reliable manner the function of permitting the frame to be expanded for the insertion of the glass after which they, in an equally reliable and certain manner, automatically contract the frame and retain the glass firmly therein.

As indicated in Fig. 1, the spiral spring coils $b$ may be utilized for the attachment of the hinged temple frames of spectacles, and in eye glasses, Fig. 2, one of the spiral spring coils $b$ may be utilized for the attachment of a handle or safety device.

Figures 3, 4:
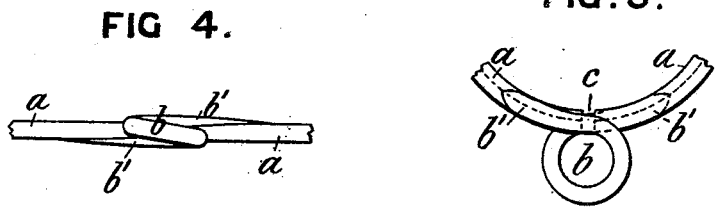
Figure 5:
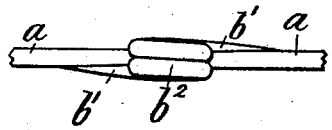

In Figs. 1 and 2 the spiral spring coil is formed integral with the frame $a$; but obviously the spiral spring coil may be formed separate from the frame and have its extremities $b$ soldered, or otherwise secured to the frame, as in Figs. 3, 4, and 5, and as shown in Fig. 5 the spring may comprise two coils $b^2$.

What I claim as my invention, and desire to secure by Letters Patent, is—

The herein described spectacle or eye-glass frame, having a portion thereof provided with a spiral spring coil which permits the expansion of the frame for the insertion of the glass, and which automatically contracts and retains the glass firmly in the frame, substantially as described.

Dated this 12th day of December, 1890.

NATHAN LAZARUS.

Witnesses:
GEORGE C. DOWNING,
  *5 Quality Court, London, W. C.*
T. F. BARNES,
  *28 Southampton Buildings, London, E. C.*